United States Patent
Pasupathy et al.

(10) Patent No.: US 11,831,520 B2
(45) Date of Patent: *Nov. 28, 2023

(54) DYNAMIC APPLICATION SLA METRIC GENERATION, DISTRIBUTION, AND INTENT-BASED SD-WAN LINK SELECTION

(71) Applicant: Juniper Networks, Inc., Sunnyvale, CA (US)

(72) Inventors: Thyagarajan S. Pasupathy, Bangalore (IN); Sankar Ramanoorthi, San Jose, CA (US); Radhakrishnan G, Bangalore (IN); Saurav Shaw, Bangalore (IN); Mohan Thangavel, Bangalore (IN); Vaibhav Belliappa, Bangalore (IN); Nagaraja Manikkar Shenoy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/301,280

(22) Filed: Mar. 30, 2021

(65) Prior Publication Data

US 2021/0218642 A1 Jul. 15, 2021

Related U.S. Application Data

(63) Continuation of application No. 16/428,649, filed on May 31, 2019, now Pat. No. 10,979,316.

(51) Int. Cl.
*H04L 41/5019* (2022.01)
*H04L 45/12* (2022.01)
*H04L 43/091* (2022.01)

(52) U.S. Cl.
CPC ........ *H04L 41/5019* (2013.01); *H04L 43/091* (2022.05); *H04L 45/123* (2013.01)

(58) Field of Classification Search
CPC ............. H04L 41/5009; H04L 41/5003; H04L 41/5019; H04L 43/0852; H04L 43/0817;
(Continued)

(56) References Cited

U.S. PATENT DOCUMENTS 8,650,326 B2 2/2014 Rangegowda et al.
9,015,314 B2 4/2015 Fu et al.
(Continued)

FOREIGN PATENT DOCUMENTS

CN 101272287 A 9/2008
CN 102447980 A 5/2012
(Continued)

OTHER PUBLICATIONS

"Series P: Terminals and Subjective and Objective Assessment Methods: Methods for objective and subjective assessment of speech and video quality," Mean opinion score (MOS) terminology, P. 800.1, ITU-T Telecommunication Standardization Sector of ITU, Jul. 2016, 18 pp.

(Continued)

*Primary Examiner* — Djenane M Bayard
(74) *Attorney, Agent, or Firm* — Shumaker & Sieffert, P.A.

(57) ABSTRACT

In general, the disclosure describes techniques for dynamic application service level agreement (SLA) metric generation, distribution, and intent-based Software-Defined Wide Area Network (SD-WAN) link selection. For instance, a network device may determine a metric associated with an application or application-group. The network device may send the metric to a controller, and in response may receive from the controller a recommended SLA metric associated with the application or application-group. The network device may also compute an intent-based SLA metric based on the recommended SLA metric, one or more characteris- (Continued)

tics of one or more links connected to the network device, and a user configured intent model that defines a tolerance level to apply the recommended SLA metric. The network device may select, based on the intent-based SLA metric, a path to send traffic from the application or application-group.

20 Claims, 7 Drawing Sheets

(58) Field of Classification Search
CPC ............ H04L 41/5025; H04L 43/0882; H04L 43/0888; H04L 43/16; H04L 41/40; H04L 43/00; H04L 43/08; H04L 12/14; H04L 41/147; H04L 43/0829; H04L 43/0894; H04L 43/12; H04L 47/2425; H04L 12/1485; H04L 67/10; H04L 47/24; H04L 41/16; H04L 47/805; H04L 67/1008; H04L 41/5022; H04L 69/329; H04L 41/024; H04L 43/10; H04L 45/04; H04L 43/0811; H04L 45/302; H04L 41/12; H04L 43/20; H04L 45/123; H04L 45/22; H04L 12/4633; H04L 41/0213; H04L 45/64; H04L 12/1403; H04L 41/145; H04L 41/508; H04L 43/062; H04L 43/091; H04L 45/02; H04L 45/50; H04L 41/0654; H04L 41/0806; H04L 41/5006; H04L 43/026; H04L 45/70; H04L 47/20; H04L 41/22; H04L 45/0377
See application file for complete search history.

(56) References Cited

U.S. PATENT DOCUMENTS

| | | | |
|---|---|---|---|
| 9,086,929 | B2 | 7/2015 | Bailey et al. |
| 10,454,812 | B2 | 10/2019 | Shenoy et al. |
| 10,979,316 | B2 | 4/2021 | Pasupathy et al. |
| 2015/0156081 | A1* | 6/2015 | Chakra ............... H04L 41/5006 709/224 |
| 2015/0156082 | A1* | 6/2015 | Kakadia ............. H04L 41/5019 709/223 |
| 2018/0027063 | A1* | 1/2018 | Nachimuthu ......... G06F 13/409 709/226 |
| 2018/0123911 | A1* | 5/2018 | Zhang ..................... H04L 43/08 |
| 2018/0359172 | A1 | 12/2018 | Yadav |
| 2019/0036779 | A1 | 1/2019 | Bajaj |
| 2019/0036780 | A1* | 1/2019 | Evans ................. H04L 41/0895 |
| 2019/0036828 | A1 | 1/2019 | Bajaj |
| 2019/0136813 | A1 | 1/2019 | Shenoy et al. |
| 2019/0052558 | A1 | 2/2019 | Mehta et al. |
| 2019/0319872 | A1 | 10/2019 | Adhikari et al. |
| 2020/0021516 | A1 | 1/2020 | Bajaj et al. |
| 2020/0067831 | A1 | 2/2020 | Spraggins et al. |
| 2020/0274794 | A1 | 8/2020 | Zhang et al. |
| 2020/0379839 | A1 | 12/2020 | Savalle et al. |
| 2020/0382387 | A1 | 12/2020 | Pasupathy et al. |

FOREIGN PATENT DOCUMENTS

| | | | |
|---|---|---|---|
| CN | 102598592 | A | 7/2012 |
| CN | 104205056 | A | 12/2014 |
| CN | 109039884 | A | 12/2018 |
| CN | 109309618 | A | 2/2019 |
| CN | 109309621 | A | 2/2019 |
| CN | 109787801 | A | 5/2019 |
| CN | 110945842 | A | 3/2020 |
| EP | 2871586 | A1 | 5/2015 |
| EP | 3435599 | A1 | 1/2019 |
| WO | 2013/184846 | A1 | 12/2013 |

OTHER PUBLICATIONS

"EANTC Independent Test Report," Juniper Contrail SD-WAN Solution, Sep. 2018, 14 pp.

"SLA Profiles and SD-WAN Policies Overview," Juniper Networks, Aug. 21, 2018, 6 pp.

Extended Search Report from counterpart European Application 19181702.2 dated Oct. 31, 2019, 11 pp.

Prosecution History from U.S. Appl. No. 16/428,649 dated Aug. 4, 2020 through Dec. 16, 2020, 22 pp.

Notice of Intent to Grant and Text Intended to Grant from counterpart European Application No. 19181702.2 dated Jun. 1, 2022, 42 pp.

Response to Extended Search Report dated Oct. 31, 2019 from counterpart European Application No. 19181702.2, filed Jun. 1, 2021, 22 pp.

Second Office Action and Search Report, and translation thereof, from counterpart Chinese Application No. 201910936905.2 dated Feb. 8, 2022, 12 pp.

Extended Search Report from counterpart European Application No. 22203908.3 dated Feb. 1, 2023, 10 pp.

First Office Action and Search Report, and translation thereof, from counterpart Chinese Application No. 202210835743.5 dated Aug. 15, 2023, 8 pp.

Response to Extended Search Report dated Feb. 1, 2023, from counterpart European Application No. 22203908.3 filed Sep. 6, 2023, 24 pp.

\* cited by examiner

DYNAMIC APPLICATION SLA METRIC GENERATION, DISTRIBUTION, AND INTENT-BASED SD-WAN LINK SELECTION

This application is a continuation of U.S. application Ser. No. 16/428,649, filed May 31, 2019, the entire content of which is herein incorporated by reference.

TECHNICAL FIELD

The disclosure relates to computer networks.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

Users may expect services to be provided by a service provider with an acceptable level of quality, commonly referred to as Quality of Experience (QoE). The QoE may be measured based on various metrics of a link, including latency, delay (inter frame gap), jitter, packet loss, and/or throughput. The users may define desired levels for one or more of the metrics for the QoE that the users expect in service contracts, e.g., service level agreements (SLAs), with the service provider. SLA metrics are typically user configurable values and are derived through trial and error methodologies or benchmark test environment versus user experience or realistic best application metrics.

SUMMARY

In general, the disclosure describes techniques for dynamic application SLA metric generation, distribution, and intent-based SD-WAN link selection in a Software-Defined Wide Area Network (SD-WAN). Network devices (e.g., routers) of an SD-WAN may specify a path (e.g., a link) for data flows between client devices and application servers. These paths are typically selected using service-level agreement (SLA) metrics of the WAN links on which the traffic flow will be transmitted. While the SLA metrics may be more static in nature, or at least predetermined prior to the network device receiving the flow, the metrics of the various WAN links may be more dynamic, as the metrics describing the capabilities of the particular WAN link may vary based on various current aspects of the network. These metrics are obtained by sending probe packets on the various links and analyzing the results of the transmission, where probe packets having the same size as the data packets in the data flow reasonably measure how the particular WAN link could handle the data flow.

In one implementation, one or more of the SD-WAN network devices (referred to herein as "SD-WAN leaf nodes") that implement one or more aspects of the techniques described herein may each dynamically learn in real-time, or near real-time, one or more metrics of a link used to send application traffic and/or traffic for a group/category of applications (referred to herein as "application-group") and send the learned metrics to a centralized controller (e.g., SLA controller). The SLA controller may compute an ideal user experience based on an aggregate of the metrics received from each of the SD-WAN leaf nodes. The ideal user experience computed by the SLA controller may be referred to as an "recommended SLA metric." Each of the SD-WAN leaf nodes may receive a recommended SLA metric for each of the application and/or application-group and compute an intent-based SLA metric to identify optimal/best path to send traffic for the application and/or application-group.

The techniques described herein may provide one or more technical advantages that provide at least one practical application. For example, the techniques described herein provide dynamic application and/or application-group metric learning from real-world network deployments through all the connected SD-WAN leaf nodes. Each of the SD-WAN leaf nodes apply SLA metrics of the best user experience from real customer application traffic rather than from lab designed/test environment application traffic. By an SLA controller periodically sending recommended SLA metric per application and/or application-group, an administrator is relieved from laborious metrics configuration efforts for each leaf node and application in changing WAN link capacities. Automated SLA metric calculation at the SLA controller frees SD-WAN vendor's extensive product engineering efforts of statically calculating per application and/or application-group metrics to recommend to customers. Moreover, the SLA controller continuously learns and calculates metrics and recommend SLA metrics available for each application and/or application-group. By dynamically learning and calculating the metrics and recommending SLA metrics for each application and/or application-group, the calculation of the SLA metrics may potentially provide more accurate and current SLA metrics, relative to manually-configured SLA metrics. Intent-based desired SLA metric calculation at an SD-WAN leaf node is adaptive to network interface conditions and user configured intent model on respective node, which enable a user to further fine tune recommended SLA metrics from the SLA controller. Moreover, one or more aspects of the techniques described provide full network visibility on which links satisfy or does not satisfy desired SLA metrics in an SD-WAN network. This enables discovery of paths/links in the SD-WAN that do not satisfy SLA requirements, which may be used to provide an indication to resolve the issue (e.g., by upgrading links).

In one example, a method includes receiving, by a controller and from a plurality of network devices of a software defined wide area network (SD-WAN), a metric of a link, wherein the metric is associated with an application or application-group. The method also includes computing, by the controller and based on an aggregate of the metric received from each of the plurality for network devices, a recommended service level agreement (SLA) metric for the application or application-group. The method further includes sending, by the controller, the recommended SLA metric to each of the plurality of network devices to cause each of the plurality of network devices to compute an intent-based SLA metric used to select a path to send traffic from the application or application-group.

In another example, a method includes determining, by a network device of a plurality of network devices of a software defined wide area network (SD-WAN), a metric of a link of the network device, wherein the metric is associated with an application or application-group. The method also includes sending, by the network device and to a controller, the metric. The method further includes receiving, by the network device and from the controller, a recommended service level agreement (SLA) metric associated with the application or application-group, wherein the recommended SLA metric is computed based on an aggregate of the metric from each of the plurality of network devices, including the metric sent by the network device. Moreover, the method includes computing, by the network device, an intent-based SLA metric based on the recommended SLA metric, one or more characteristics of one or more links connected to the network device, and a user configured intent model that defines a tolerance level to apply the recommended SLA metric. The method also includes selecting, by the network device and based on the intent-based SLA metric, a path to send traffic from the application or application-group.

In yet another example, a network device of a plurality of network devices of a software defined wide area network (SD-WAN) includes a memory. The network device also includes one or more processors in communication with the memory, the one or more processors configured to: determine a metric of a link of the network device, wherein the metric is associated with an application or application-group. The one or more processors of the network device are also configured to send the metric to a controller. The one or more processors of the network device are further configured to receive, from the controller, a recommended service level agreement (SLA) metric associated with the application or application-group, wherein the recommended SLA metric is computed based on an aggregate of the metric from each of the plurality of network devices, including the metric sent by the network device. The one or more processors of the network device are also configured to compute an intent-based SLA metric based on the recommended SLA metric, one or more characteristics of one or more links connected to the network device, and a user configured intent model that defines a tolerance level to apply the recommended SLA metric. The one or more processors of the network device are further configured to select, based on the intent-based SLA metric, a path to send traffic from the application or application-group.

The details of one or more examples are set forth in the accompanying drawings and the description below. Other features, objects, and advantages will be apparent from the description and drawings, and from the claims.

DETAILED DESCRIPTION

Figure 1:
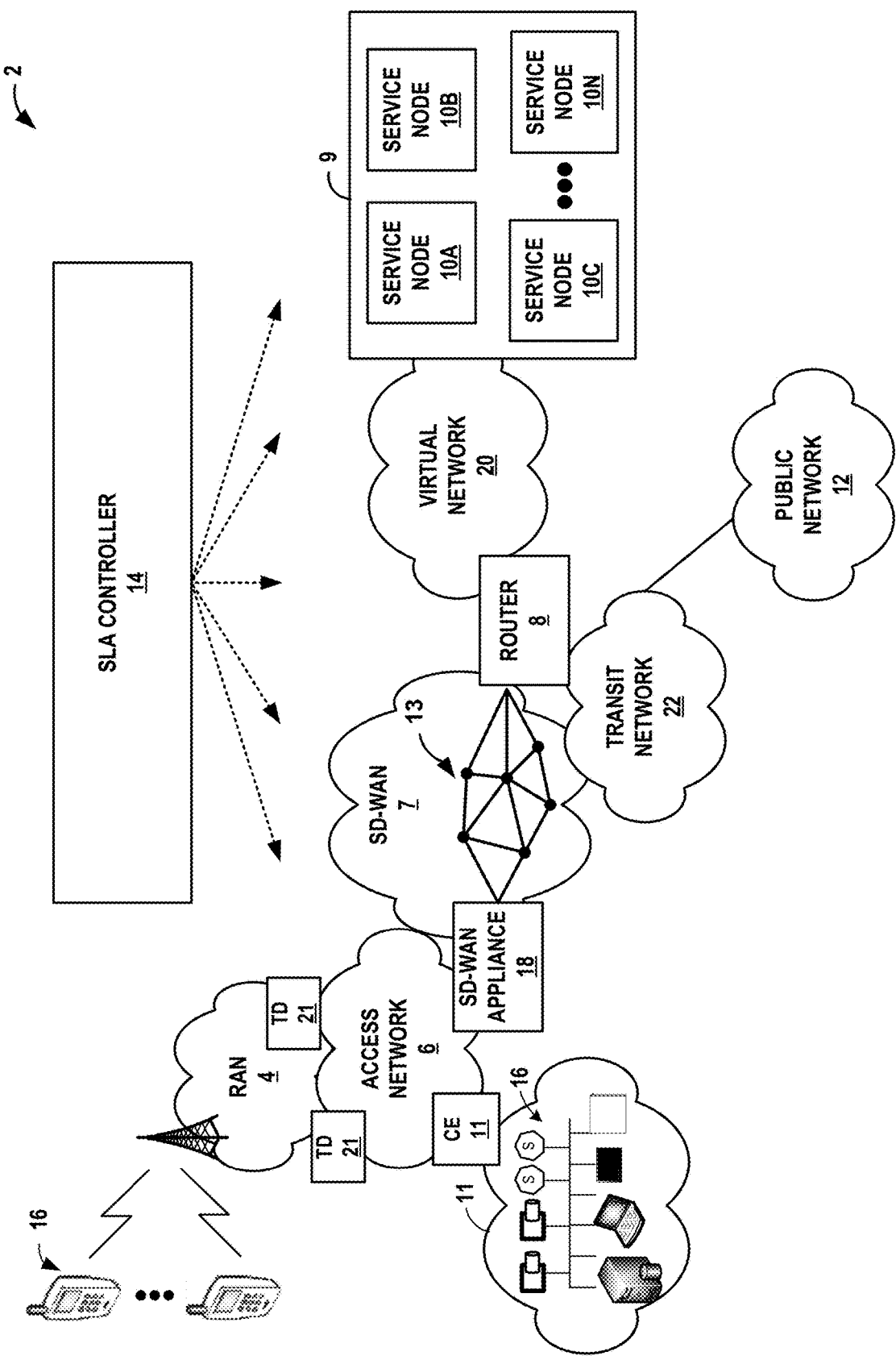
FIG. 1 is a block diagram illustrating an example SD-WAN that performs dynamic application SLA metric generation, distribution, and intent-based SD-WAN link selection, in accordance with one or more aspects of the techniques described in this disclosure.

FIG. 1 is a block diagram illustrating an example SD-WAN that performs dynamic application SLA metric generation, distribution, and intent-based SD-WAN link selection, in accordance with one or more aspects of the techniques described in this disclosure. In the illustrated example of FIG. 1, a service provider network 2 operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

Service provider network 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or data center 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of service provider network 2 via a radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as radio access network (RAN) 4. Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

An SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. SD-WAN 7 may include network devices 13, including SD-WAN appliance 18 and router 8, that forward application traffic on WAN links within SD-WAN 7. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. SD-WAN appliance 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, SD-WAN appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services executing on one or more service cards installed within data center 9. In addition, or alternatively, service provider network 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services and/or service nodes 10 may apply stateful firewall (SFW) and security services, deep packet inspection (DPI), carrier grade network address translation (CGNAT), traffic destination function (TDF) services, media (voice/video)

optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, a centralized controller (not shown) for the software-defined network (e.g., an SDN controller) may also provide a forwarding rule set to SD-WAN appliance 18 or router 8 for managing the forwarding path. In some examples, the SDN controller manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, service provider network 2 comprises a software defined network (SDN) and network functions virtualization (NFV) architecture. An SDN controller may provide a high-level controller device for configuring and managing the routing and switching infrastructure of service provider network 2. NFV orchestrator device (not shown in FIG. 1) may provide a high-level orchestrator for configuring and managing virtualization of network services into service nodes 10 of data center 9. In some instances, the SDN controller manages deployment of virtual machines (VMs) within the operating environment of data center 9. For example, the SDN controller may interact with provider edge (PE) router 8 to specify service chain information. For example, the service chain information provided by the SDN controller may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within network system 2, such as SD-WAN appliance 18, perform application data monitoring using various application quality of experience (QoE) metric functions, such as real-time performance monitoring (RPM), one-way active measurement protocol (OWAMP), two-way active measurement protocol (TWAMP), active probing, passive-probing, protocol deep packet inspection (DPI) engines, or other measurement protocols or techniques. That is, these measurement protocols or techniques may be used within service provider network 2 to measure real-time or near real-time metrics of WAN links of SD-WAN 7, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol/technique and perform specific roles to start data sessions (otherwise referred to as "test sessions") and exchange test packets for the data sessions. The test packets are exchanged with embedded metrics, such as timestamps, that are used to compute the metrics.

In some instances, users may define desired levels for one or more of the metrics for the QoE that the users expect in service contracts, e.g., service level agreements (SLAs), with the service provider. The desired level for the one or more metrics (referred to herein as "SLA metrics") are typically user configurable values and are derived through trial and error methodologies or benchmark test environment versus user experience or realistic best application metrics. Network devices 13 of SD-WANsss 7 (e.g., SD-WAN appliance 18) may determine a best path to forward traffic flows based on the SLA metrics. However, user configured SLA metric values are laborious and are subjective to a benchmark test environment suggested by vendors. For example, network systems may typically include large numbers of applications, each of which requires a user to configure an SLA metric to arrive at the suggested benchmark. Moreover, any changes to the suggested benchmarks would require a user to manually configure each of the SLA metrics.

In accordance with the techniques described herein, network system 2 performs dynamic application SLA metric generation, distribution, and intent-based SD-WAN link selection. For example, network system 2 may include an Application SLA metric controller 14 ("SLA controller 14") that receives one or more metric values for each application and/or application-group from each of network devices 13 of SD-WAN 7 (referred to as "SD-WAN leaf nodes" of the SLA controller 14) that are managed by SLA controller 14, and distributes a recommended SLA metric for each application and/or application-group to the SD-WAN leaf nodes such that the SD-WAN leaf nodes may compute an intent-based SLA metric based (in part) for each application and/or application-group, where the intent-based SLA metric is used to determine an optimal/best path or link to send traffic for a respective application and/or application-group.

In the illustrated example of FIG. 1, each of the SD-WAN leaf nodes may dynamically learn in real-time or near real-time one or more metrics for each application and/or application-group. For example, SD-WAN leaf nodes may use TWAMP (or other measurement protocol) to exchange test packets on its links to measure end-to-end metrics for each application and/or application-group. Using the test packets, each of the SD-WAN leaf nodes may compute metrics, such as path connectivity, path delay, packet jitter, packet loss, packet re-ordering, and the like. The SD-WAN leaf nodes may each store learned metrics for each application in a data structure, such as a database. As further described in FIG. 2, the SD-WAN leaf nodes may also associate each of the applications with an application-group and store this information in the data structure.

The SLA controller 14 may obtain the one or more learned metrics from each of the SD-WAN leaf nodes. For example, each of the SD-WAN leaf nodes may send one or more learned metrics for a specific application and/or application-group to SLA controller 14. For example, each of the SD-WAN leaf nodes may send one or more learned metrics for a specific application. Alternatively, or additionally, each of the SD-WAN leaf nodes may send one or more learned metrics for applications of a group (e.g., web applications, or non-real-time and asymmetric (NRTA) applications). Each of the SD-WAN leaf nodes may send the one or more learned metrics as a batch, or in some instances as they are learned. In some instances, the SD-WAN leaf nodes may periodically send the one or more metrics based on configured intervals (e.g., every 15 minutes). Each of the SD-WAN leaf nodes may send the one or more learned metrics using secure sockets layer (SSL), Transport Layer Security (TLS), Hyper Text Transport Layer (HTTP), Hyper Text Transfer Protocol Secure (HTTPS) or other protocol to establish a communication channel (and in some instances a secure communication channel) between the SLA controller 14 and the SD-WAN leaf nodes. In some examples, SLA controller 14 may pull the one or more learned metrics from each of the SD-WAN leaf nodes, such as by initiating a request to receive the one or more learned metrics from the SD-WAN leaf nodes or to retrieve the one or more learned metrics directly from the data structure of each of the SD-WAN leaf nodes.

SLA controller 14 receives the one or more learned metrics from the SD-WAN leaf nodes and may compute a recommended SLA metric, i.e., an ideal user experience, for each application and/or application-group. For example, SLA controller 14 may determine, from an aggregate of a metric for a respective application and/or application-group obtained from the SD-WAN leaf nodes, a mean (and in some instances a standard deviation) of the aggregate of the metric. SLA controller 14 may compute a recommended SLA metric for each of the applications and/or application-groups. SLA controller 14 pushes the recommended SLA metric for each application and/or application-group to each SD-WAN leaf node. For example, SLA controller 14 may send the recommended SLA metric using the secure communication channel (e.g., SSL) or as a plain text.

When the SD-WAN leaf nodes receive the recommended SLA metric from SLA controller 14, the SD-WAN leaf nodes may perform an intent-based SLA metric calculation and link selection for each of the applications and/or application-group. As further described in FIG. 3, each of the SD-WAN leaf nodes may compute an intent-based SLA metric based on the recommended SLA metric received from SLA controller 14, one or more characteristics of the links connected to the SD-WAN leaf node, and a user configured intent model that defines a desired tolerance level to further fine tune the recommended SLA metric received from SLA controller 14.

Each of the SD-WAN leaf nodes may compute an end-to-end best constraint path metric per application and/or application-group based on the intent-based SLA metric. For example, each of the SD-WAN leaf nodes may determine an optimal/best path to forward application traffic using shortest path algorithms such as Dijkstra's algorithm, Bellman-Ford algorithm, Breadth-First Search (BFS), Depth-First Search (DFS), Floyd-Warshall algorithm, Johnson's algorithm, Kruskal's algorithm, Prim's algorithm, Borůvka's algorithm, or similar algorithms. As further described below with respect to FIG. 4, when using the shortest path algorithms, each of the SD-WAN leaf nodes may determine a path based on a per hop metric (e.g., a link that best satisfies the intent-based SLA metric) for each of the applications and/or application-groups.

By applying a shortest path algorithm, each of the SD-WAN leaf nodes may have end-to-end visibility of the links that satisfy and/or do not satisfy the intent-based SLA metric per application and/or application-group. For instance, an SD-WAN leaf node may implement the shortest path algorithm and may determine which of the links satisfy or does not satisfy the intent-based SLA metric. The SD-WAN leaf node may store the determined path and information indicating which of the links satisfy and/or do not satisfy the intent-based SLA metric.

In some examples, each of the SD-WAN leaf nodes may monitor network performance over a period of time. For example, each of the SD-WAN leaf nodes may feed the one or more learned metrics into a machine-learning model (which may execute on the leaf node, in some examples), such as a Support Vector Machine (SVM) model, K-nearest neighbors (KNN) model, logistic regression model, and/or deep learning model. An SD-WAN leaf node may use the machine-learning model to classify the observed metrics and learn the accurate values over a period of time. In one implementation, a machine learning model of the SD-WAN leaf node may compute a mean opinion score as described in Telecommunication Standardization Sector of International Telecommunication Union (ITU-T) P.800.1, entitled "SERIES P: TERMINALS AND SUBJECTIVE AND OBJECTIVE ASSESSMENT METHODS, Methods for objective and subjective assessment of speech and video quality," Mean opinion score (MOS) terminology, July 2016, the entire contents of which is incorporated by reference herein. A MOS may represent a single rational number (e.g., 1-5) where 1 is the lowest perceived quality and 5 is the highest perceived quality. The machine learning model of the SD-WAN leaf node may compute an estimated MOS (EMOS) for the application-group to evaluate the link behavior for any of the applications belonging to these groups. The machine learning model of the SD-WAN leaf node may perform a perpetual evaluation of link performance metrics and derive an estimated MOS for the different application categories. That is, the links are continuously monitored and the performance metrics for latency, jitter, packet loss, etc. are correlated to arrive at the link MOS scores for different application categories. The estimated MOS is then translated into SLA target metrics and dynamically updated of the SD-WAN leaf node.

In the illustrated example of FIG. 1, SD-WAN appliance 18 (e.g., an SD-WAN leaf node) may determine a shortest path based on a per hop metric (e.g., intent-based SLA metric) to router 8 for each application and/or application-group. SD-WAN appliance 18 may select a path along one or more of the interconnecting communication links that satisfy the intent-based SLA metric computed by SD-WAN appliance 18. Each of network devices 13 of SD-WAN 7 may also select a path along one or more of the interconnecting communication links that satisfy the intent-based SLA metric computed by the network device. Each of the network devices 13 of SD-WAN 17 may also store the network health of the links (e.g., whether the links meet or does not meet the intent-based SLA metrics).

In some examples, each of the SD-WAN leaf nodes may determine a shortest path when the user configured intent model is changed, e.g., from an aggressive intent model to a weaker intent model. For instance, an SD-WAN leaf node may, at an initial instance (e.g., T1), be configured with an aggressive intent model for an application. For example, when the SD-WAN receives traffic from the application, the SD-WAN leaf node may select the link of a plurality of links that satisfy the one or more SLA metrics within a tolerance threshold (e.g., 10-15% tolerance against the recommended SLA metric). A user may, in a subsequent instance (e.g., ΔT), change the aggressive intent model to a conservative intent model for the application. When the SD-WAN leaf node receives traffic from the application, the SD-WAN leaf node may select a link of the plurality of links that applies a stricter metric dataset relative to the one or more recommended SLA metrics.

The techniques described herein may provide one or more technical advantages that provide at least one practical application. For example, the techniques described herein provide dynamic application and/or application-group metric learning from real-world network deployments through all the connected SD-WAN leaf nodes. Each of the SD-WAN leaf nodes apply SLA metrics of the best user experience from real customer application traffic rather than from lab designed/test environment application traffic. By an SLA controller periodically sending recommended SLA metric per application and/or application-group, an administrator is relieved from laborious metrics configuration efforts for each leaf node and application in changing WAN link capacities. Automated SLA metric calculation at the SLA controller frees SD-WAN vendor's extensive product engineering efforts of statically calculating per application and/or application-group metrics to recommend to customers. Moreover, the SLA controller continuously learns and calculates metrics and recommend SLA metrics available for each application and/or application-group. By dynamically learning and calculating the metrics and recommending SLA metrics for each application and/or application-group, the calculation of the SLA metrics may potentially provide more accurate and current SLA metrics, relative to manually-configured SLA metrics. Intent-based desired SLA metric calculation at an SD-WAN leaf node is adaptive to network interface conditions and user configured intent model on respective node, which enable a user to further fine tune recommended SLA metrics from the SLA controller. Moreover, one or more aspects of the techniques described provide full network visibility on which links satisfy or does not satisfy desired SLA metrics in an SD-WAN network. This enables discovery of paths/links in the SD-WAN that do not satisfy SLA requirements, which may be used to provide an indication to resolve the issue (e.g., by upgrading links).

Figure 2:
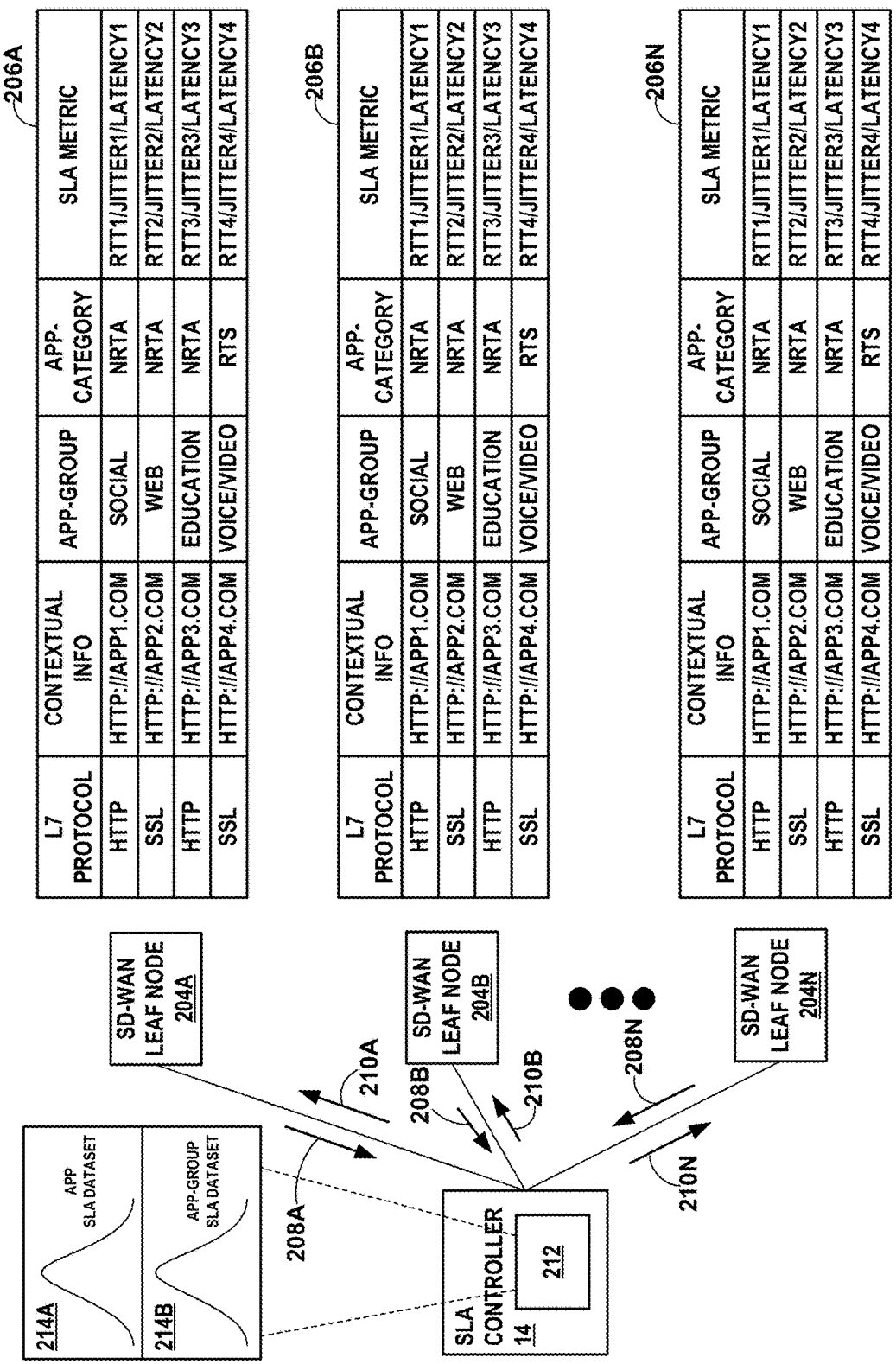
FIG. 2 is a block diagram illustrating an example dynamic application SLA metric generation and distribution of recommended SLA metrics of the SD-WAN, in accordance with one or more aspects of the techniques described in this disclosure.

FIG. 2 is a block diagram illustrating an example dynamic application SLA metric generation and distribution of recommended SLA metrics of the SD-WAN, in accordance with one or more aspects of the techniques described in this disclosure.

In the illustrated example of FIG. 2, SD-WAN leaf nodes 204A-204N (collectively, "SD-WAN leaf nodes 204") may represent any of network devices 13 of SD-WAN 7 of FIG. 1. Each of SD-WAN leaf nodes 204 may dynamically learn in real-time or near real-time one or more metrics for each application and/or application-group. For example, SD-WAN leaf nodes 204 may each use TWAMP (or other measurement protocol) to exchange test packets to measure end-to-end metrics for each application and/or application-group and store the learned metrics for each application in a data structure, such as a respective one of databases 206A-206N (collectively, "databases 206").

In this example, SD-WAN leaf node 204A may learn metrics RTT1, JITTER1, and/or LATENCY1 for a first application, APP1, and store the information in database 206A. Similarly, SD-WAN leaf node 204A may learn one or more metrics for other applications, e.g., APP2-APP4. Each of SD-WAN leaf nodes 204B-204N may also learn one or more metrics for each of the applications.

Each of SD-WAN leaf nodes 204 may also associate each of the applications with an application-group. For example, one or more applications may be grouped based on a respective standard of Quality of Service (otherwise referred to as Class of Service) (not shown in FIG. 2). For example, certain applications may necessitate a higher priority and/or higher bandwidth. For example, one or more applications (e.g., video applications) may necessitate a higher priority or higher dedicated bandwidth and may be grouped together as applications having a gold standard. One or more applications may necessitate a moderate priority and/or moderate dedicated bandwidth and may be grouped together as applications having a silver standard. One or more applications may necessitate a lower priority or lower dedicated bandwidth and may be grouped together as applications having a bronze standard. Although described with respect to a gold, silver, and bronze standard of QoS, the one or more applications may be grouped in other standards of QoS, such as platinum that groups applications (e.g., voice applications such as VoIP) that necessitate the highest priority or highest dedicated bandwidth.

Applications may also be categorically grouped based on a type of application, such as web, finance, education, social networking, evasive applications, or other types of applications. For example, SD-WAN leaf node 204A may associate APP1 and other social applications with application-group SOCIAL, associate APP 2 and other web applications with application-group WEB, and so on. Each of SD-WAN leaf nodes 204B-204N may also associate one or more applications with application-groups.

One or more applications may alternatively, or additionally, be categorized based on one or more characteristics of the application, such as whether an application is non-real-time and asymmetric (NRTA), non-real-time and symmetric (NRTS), real-time and asymmetric (RTA), and real-time and symmetric (RTS), for example. NRTA applications generate traffic that is considered best effort traffic. That is, the traffic is transmitted using a best effort protocol. The best effort protocol does not provide any specific QoS reliability and simply processes traffic on a first-come, first-served basis. Common NRTA applications include web browsing—Hyper Text Transport Protocol (HTTP), Email, File Transfer Protocol (FTP), and Telnet. NRTS applications typically involve client devices requesting data and services from a host device and requires equivalent resource consumption at each device. An example of a NRTS application includes Internet Relay Chat. RTA applications have QoS requirements, often stringent QoS requirements, due to the nature of real-time transmissions. Common RTA applications include audio broadcasting, video broadcasting, interactive audio on demand, interactive video on demand and telemetry. RTS applications may include applications that are conversational in nature, such as teleconferencing (including audio, audiographics, and video conferencing), videophony, and voice over IP (VoIP).

In the illustrated example of FIG. 2, SD-WAN leaf node 204A may associate applications APP1-APP3 with an application-category of NRTA, and associate application APP4 with an application-category of RTS. Although the examples described herein are described with respect to specific groups based on a standard of QoS or type of application, the techniques described herein may be applied to any kind of grouping of a plurality of applications. The application-groups may be pre-defined and/or user defined.

The SLA controller 14 may obtain the one or more learned metrics from each of the SD-WAN leaf nodes 204. For example, each of the SD-WAN leaf nodes 204 may send one or more learned metrics stored in its database for a specific application and/or application-group to SLA controller 14. In some examples, SLA controller 14 may pull the one or more learned metrics from the database of each of the SD-WAN leaf nodes 204, such as by initiating a request to receive the one or more learned SLA metrics from the SD-WAN leaf nodes 204 or to access the database of each of the SD-WAN leaf nodes 204 to retrieve one or more learned metrics stored in the database.

In the illustrated example of FIG. 2, SD-WAN leaf node 204A may send metrics including RTT1, JITTER1, and LATENCY1 for a first application APP1 to SLA controller 14 using HTTP. For instance, SD-WAN leaf node 204A may send an HTTP message 208A with the metrics for APP 1. Similarly, SD-WAN leaf node 204B may send an HTTP message 208B with metrics including RTT1, JITTER1, and LATENCY1 for the first application APP1. Likewise, SD-WAN leaf node 204N may send an HTTP message 208N with metrics including RTT1, JITTER1, and LATENCY1 for the first application APP1. Although the example illustrated in FIG. 2 uses HTTP to send SLA metrics, the SD-WAN leaf nodes may implement any communication protocol to establish a communication session with SLA controller 14.

Alternatively, or additionally, each of the SD-WAN leaf nodes 204 may send one or more learned metrics for an application-group. For example, SD-WAN leaf node 204A may send one or more learned metrics for each of the applications associated with application-category NRTA. In this example, SD-WAN leaf node 204A may send one or more messages with one or more metrics for applications associated with application-category NRTA. For instance, SD-WAN leaf node 204A may send a first message with RTT1, JITTER1, and LATENCY1 for the first application APP1, a second message with RTT2, JITTER2, and LATENCY2 for the second application APP2, and a third message with RTT3, JITTER3, and LATENCY3 for the third application APP3. In some examples, SD-WAN leaf node 204A may send the metrics for applications APP1-APP3 in a single message. Similarly, each of SD-WAN leaf nodes 204B-204N may also send one or more messages for one or more metrics for an application associated with application-category NRTA.

Each of the SD-WAN leaf nodes 204 may send the one or more learned metrics as a batch, or in some instances as they are learned. In some instances, the SD-WAN leaf nodes may periodically send the one or more metrics based on configured intervals (e.g., every 15 minutes).

In response to receiving the one or more learned metrics from each of the SD-WAN leaf nodes 204, SLA controller 14 may compute a recommended SLA metric, i.e., an ideal user experience, for each application and/or application-group. For example, SLA controller 14 may include a recommended SLA metric module 212 that may compute, from an aggregate of a metric obtained from each of the SD-WAN leaf nodes 204, a mean (and in some instances a standard deviation) of the aggregate of the metric for each application and/or application-group. In this example, the recommended SLA metric module 212 may determine a mean RTT (illustrated as 214A in FIG. 2) from an aggregate of the RTT1 values for the APP1 received from each of SD-WAN leaf nodes 204. Additionally, or alternatively, the recommended SLA metric module 212 may determine a mean RTT (illustrated as 214B of FIG. 2) from an aggregate of the RTT values for APP1-APP3 associated with application-group NRTA received from each of SD-WAN leaf nodes 204.

SLA controller 14 pushes the recommended SLA metric for each application and/or application-group to each SD-WAN leaf node. For example, SLA controller 14 may send the recommended SLA metric included in each of messages 210A-210N (collectively, "recommended SLA metric messages 210") to the SD-WAN leaf nodes 204. The recommended SLA metric messages 210 may be sent using a secure communication channel (e.g., SSL) or as plain text. In the example of FIG. 2, SLA controller 14 may send a recommended SLA metric (e.g., RTT) for an application (e.g., APP1) and/or application-group (e.g., NRTA) to the SD-WAN leaf nodes 204 that is to be used in part by the SD-WAN leaf nodes 204 to perform intent-based link selection, as further described in FIG. 3.

Figure 3:
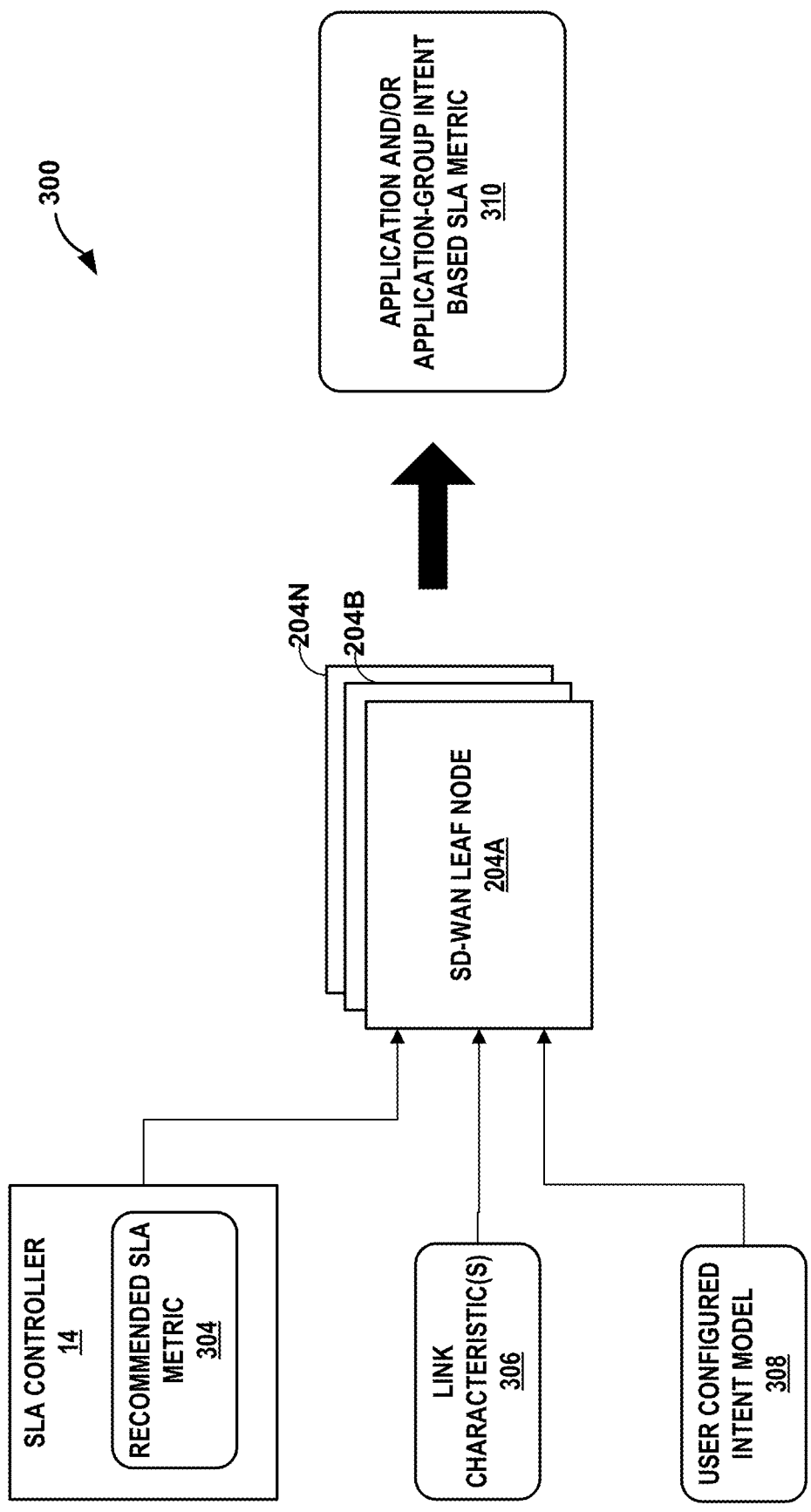
FIG. 3 is a block diagram illustrating a logical example of intent-based SLA metric calculation, in accordance with one or more aspects of the techniques described in this disclosure.

FIG. 3 is a block diagram illustrating a logical example of intent-based SLA metric calculation, in accordance with one or more aspects of the techniques described in this disclosure.

When the SD-WAN leaf nodes 204 receive the recommended SLA metric for each application and/or application-group from SLA controller 14, the SD-WAN leaf nodes may perform an intent-based SLA metric calculation 300 for each of the applications and/or application-groups. That is, the SD-WAN leaf nodes 204 apply an intent-based model to the received recommended SLA metrics, which may in some cases result in modification to the recommended SLA metrics. In the illustrated example of FIG. 3, SD-WAN leaf node 204A may compute an intent-based SLA metric 310 based on a recommended SLA metric 304 received from SLA controller 14, one or more SD-WAN link characteristics 306, and a user configured intent model 308. As described above, the recommended SLA metric 304 is a mean value of a metric (e.g., RTT) for an application or application-group that was received from SLA controller 14. The SD-WAN link characteristics 306 may include different characteristics for different types of links connected to the SD-WAN leaf node. For example, the links may include physical links such as 100 Gigabit Ethernet links and/or satellite links, and wireless links such as wireless links configured with Third Generation Mobile Telecommunications (3G) standard, Fourth Generation Mobile Telecommunications (4G), Fifth Generation Mobile Telecommunications (5G) standard, or other wireless technologies. The characteristics of a link depend on the type of link. For example, if the SD-WAN leaf node is connected to a physical link, the link characteristics 306 may include characteristics for link type (e.g., media fiber or copper), whether data rate is supported, whether the SD-WAN leaf node is a transceiver, whether the vendor specified characteristics, signal strength, and other characteristics. In some examples, if the SD-WAN leaf node is connected to a wireless link, the link characteristics 306 may include characteristics such as latency, signal strength, coverage, data rate, bandwidth per unit area, frequency, vendor, and other characteristics.

The user-configured intent model 308 may include a model that defines a desired tolerance level to further fine-tune the recommended SLA metric received from SLA controller 14. For example, a user may configure an aggressive intent model that may cause the SD-WAN leaf node to aggressively apply the recommended SLA metric. In some examples, the tolerance level of an aggressive intent model is configured as 10-15% tolerance against the recommended SLA metric. The SD-WAN leaf node may select a link if the metrics of the link fall within 10-15% of the recommended SLA metric. A user may alternatively, or additionally, configure a normal intent model that may cause the SD-WAN leaf node to apply the recommended SLA metric as is it is received without modification. Alternatively, or additionally, a user may configure a weak intent model that may cause the SD-WAN leaf node to conservatively apply the recommended SLA metric. For example, the SD-WAN leaf node may select a link that applies a stricter metric dataset relative to the recommended SLA metrics. As further described in FIG. 4, each of the SD-WAN leaf nodes 204 may compute an end-to-end best constraint path metric per application and/or application-group based on the intent-based SLA metric.

Figure 4:
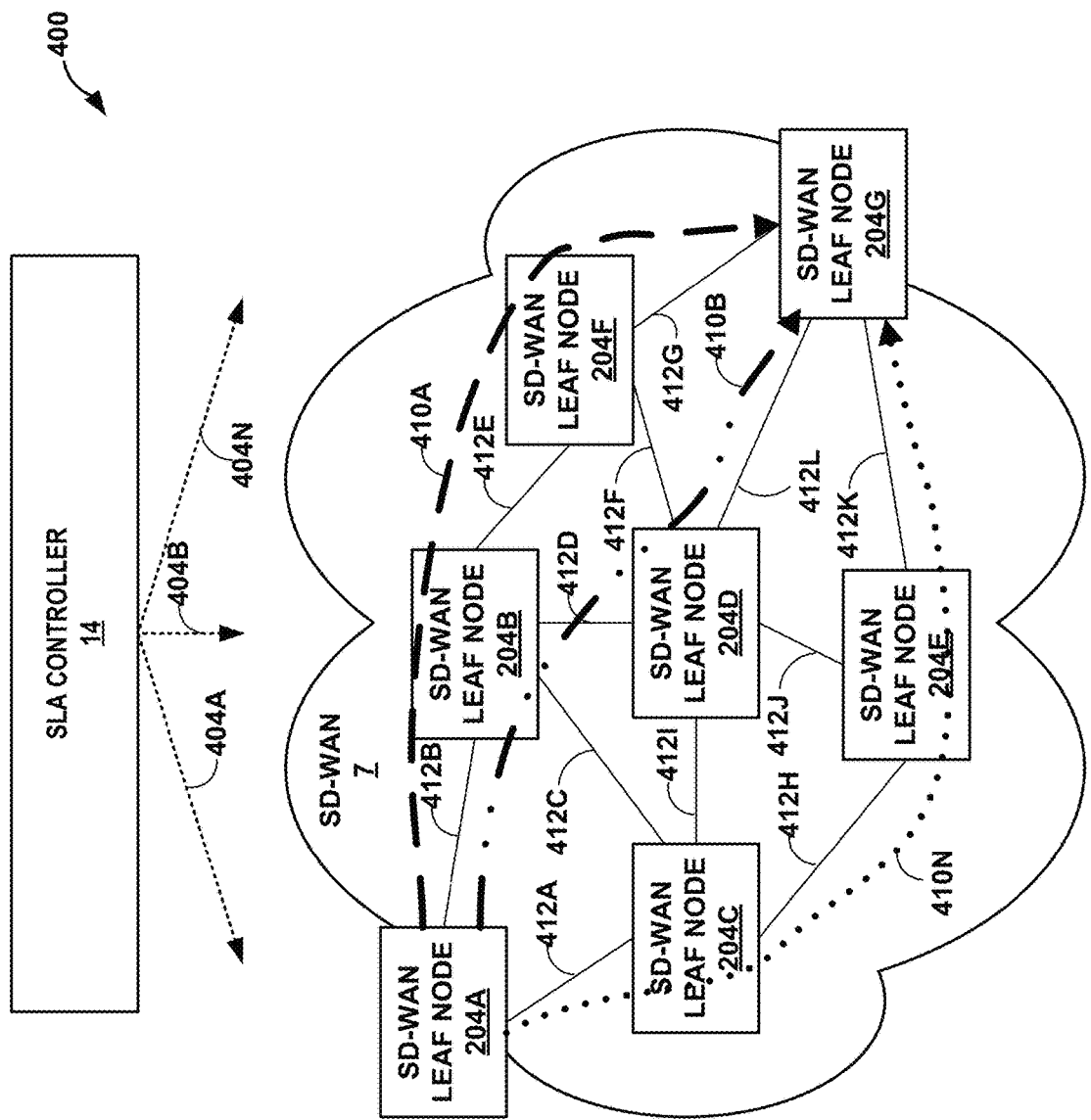
FIG. 4 is a block diagram illustrating an example technique for path selection of the SD-WAN based on intent-based SLA metric calculation, in accordance with one or more aspects of the techniques described in this disclosure.

FIG. 4 is a block diagram illustrating an example technique for path selection of the SD-WAN based on intent-based SLA metric calculation, in accordance with one or more aspects of the techniques described in this disclosure.

When the SD-WAN leaf nodes receive the recommended SLA metrics 404A-404N (collectively, "recommended SLA metrics 404") from SLA controller 14, the SD-WAN leaf nodes 204A-204G (collectively, "SD-WAN leaf nodes 204") may perform an intent-based SLA metric calculation and link selection for each of the applications and/or application-group. As described above, each of the SD-WAN leaf nodes 204 may compute an end-to-end best constraint path metric per application and/or application-group based on the intent-based SLA metric that was derived from the recommended SLA metrics 404, one or more SD-WAN link characteristics of the links connected to the router, and a user configured intent model that defines a desired tolerance level to further fine tune the recommended SLA metric received from SLA controller 14. Each of SD-WAN leaf nodes 204 may then apply a shortest path algorithm using the intent-based SLA metric per hop to determine the best/optimal path for which to send traffic for an application and/or application-group.

In the illustrated example of FIG. 4, each of SD-WAN leaf nodes 204A-204G are connected by links 412A-412L (collectively, "links 412"), respectively. Each of SD-WAN leaf nodes 204A-204G may compute an intent-based SLA metric for a first application or first application-group based on the recommended SLA metric 404A for the first application or first application-group, characteristics of connected links, and a user-configured intent model described above in FIG. 3. For example, SD-WAN leaf node 204A may compute an intent-based SLA metric for the first application based on the recommended SLA metric 404A, the link characteristics of links 412A, 412B, and a user configured intent model. SD-WAN leaf node 204B may compute an intent-based SLA metric for the first application or first application-group based on the recommended SLA metric 404A, the link characteristics of links 412C, 412D, and 412E, and the user configured intent model. The other SD-WAN leaf nodes 204C-204G may each compute an intent-based SLA metric for the first application or first application-group.

In response to applying a shortest path algorithm based on the intent-based SLA metric, SD-WAN leaf nodes 204 may compute path 410A to send traffic of the first application or first application-group through SD-WAN leaf nodes 204A, 204B, 204F, and 204G. For example, SD-WAN leaf node 204A may determine that link 412B satisfies the intent-based SLA metric for the first application or first application-group, SD-WAN leaf node 204B may determine that link 412E satisfies the intent-based SLA metric for the first application or first application-group, and SD-WAN leaf node 204F may determine that link 412G satisfies the intent-based SLA metric for the first application or first application-group. As such, SD-WAN leaf nodes 204A, 204B, 204F, and 204G are each configured to forward traffic of the first application or first application-group along path 410A.

As another example, each of SD-WAN leaf nodes 204A-204G may compute an intent-based SLA metric for a second application or second application-group based on the recommended SLA metric 404B for the second application or second application-group, characteristics of connected links, and a user-configured intent model. In response to applying a shortest path algorithm based on the intent-based SLA metric, SD-WAN leaf nodes 204 may compute path 410B to send traffic of the second application or second application-group through SD-WAN leaf nodes 204A, 204B, 204D, and 204G. For example, SD-WAN leaf node 204A may determine that link 412B satisfies the intent-based SLA metric for the second application or second application-group, SD-WAN leaf node 204B may determine that link 412D satisfies the intent-based SLA metric for the second application or second application-group, and SD-WAN leaf node 204D may determine that link 412L satisfies the intent-based SLA metric for the second application or second application-group. As such, SD-WAN leaf nodes 204A, 204B, 204D, and 204G are each configured to forward traffic of the second application or second application-group along path 410B.

As yet another example, each of SD-WAN leaf nodes 204A-204G may compute an intent-based SLA metric for an Nth application or Nth application-group based on the recommended SLA metric 404N for the Nth application or Nth application-group, characteristics of connected links, and a user-configured intent model. In response to applying a shortest path algorithm based on the intent-based SLA metric, SD-WAN leaf nodes 204 may compute path 410N to send traffic of the Nth application or Nth application-group through SD-WAN leaf nodes 204A, 204C, 204E, and 204G. As such, SD-WAN leaf nodes 204A, 204C, 204E, and 204G are each configured to forward traffic of the Nth application or Nth application-group along path 410N.

Figure 5:
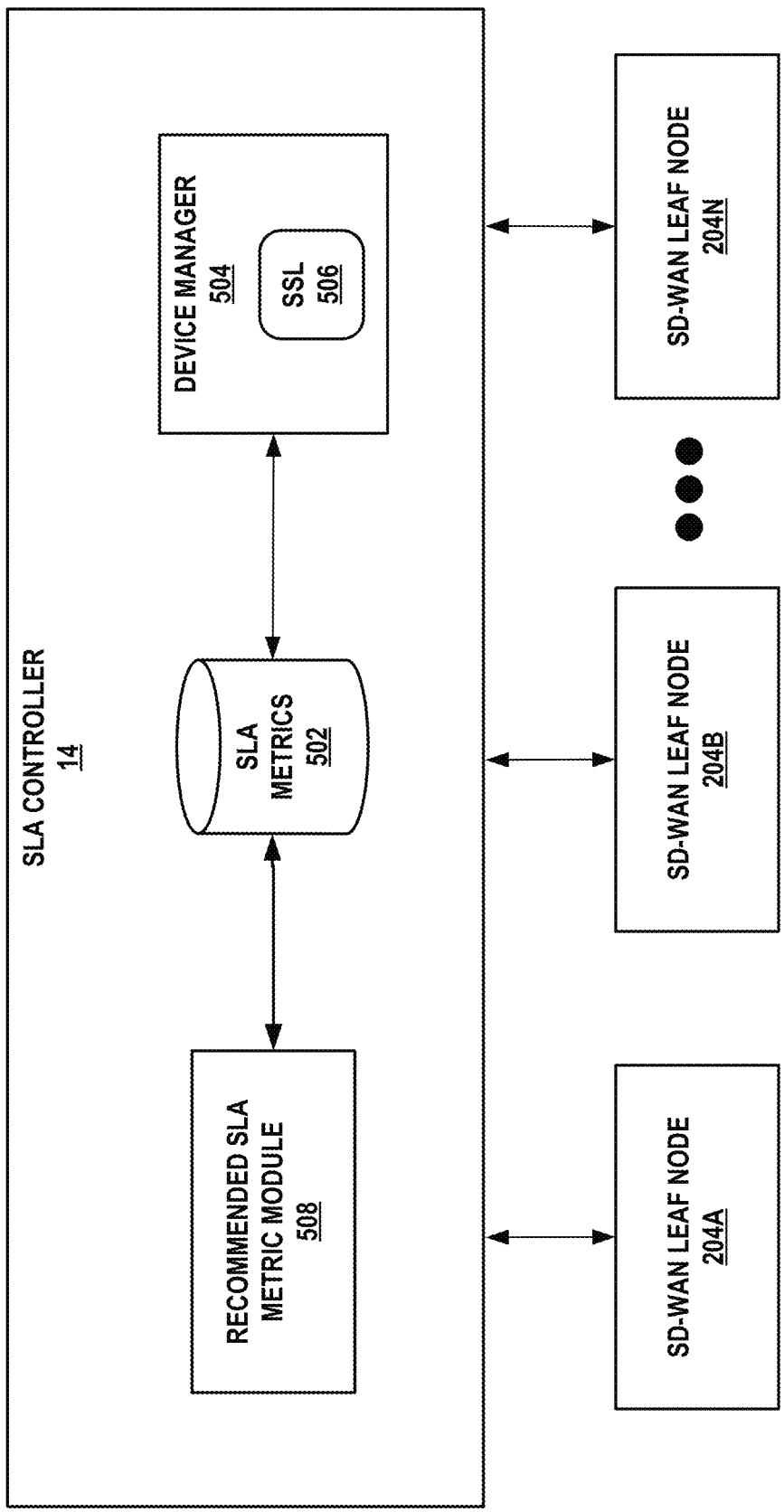
FIG. 5 is a block diagram illustrating an example SLA controller configured in accordance with one or more aspects of the techniques described herein.

FIG. 5 is a block diagram illustrating an example SLA controller configured in accordance with one or more aspects of the techniques described herein. In the example of FIG. 5, SLA controller 500 may represent an example instance of SLA controller 14 of FIGS. 1-4 in further detail. As shown in the example of FIG. 5, SLA controller 500 may represent a collection of tools, systems, devices, engines, and modules that perform operations in accordance with one or more aspects of the techniques described in this disclosure. SLA controller 500 of FIG. 5 may be implemented in a manner consistent with the description of SLA controller 14 provided in connection with FIGS. 1-4.

In the example of FIG. 5, SLA controller 500 includes SLA metrics 502. SLA metrics 502 may store one or more metrics received from SD-WAN leaf nodes 204A-204N. In some examples, SLA metrics 502 may be implemented as any type of data structure, such as a data store or database. In such an example, SLA metrics 502 may represent any suitable data structure or storage medium for storing metrics and/or information relating to metrics received from SD-WAN leaf nodes 202.

In the example of FIG. 5, SLA controller 500 includes device manager 504 that may communicate with one or more SD-WAN leaf nodes 204 to obtain one or more metrics for each application and/or application-group and/or to send a recommended SLA metric for each of the applications and/or application-groups to each of SD-WAN leaf nodes 204. Device manager 504 may implement various communication protocols/techniques, such as Secure Socket Layer 506 ("SSL 506") to receive one or more metrics from each of SD-WAN leaf nodes 204 or send a recommended SLA metric to each of SD-WAN leaf nodes 204. Although device manager 504 is illustrated as implementing SSL 506, device manager 504 may implement additional, or alternative, protocols, such as Transport Layer Security (TLS), Hyper Text Transport Protocol (HTTP), Hyper Text Transfer Protocol Secure (HTTPS), to establish a communication channel (and in some instances a secure communication channel) between the SLA controller 500 and the SD-WAN leaf nodes 204. Device manager 504 may store the one or more metrics received from SD-WAN leaf nodes 204 in SLA metrics 502. Device manager 504 may retrieve one or more recommended SLA metrics for each application and/or application-group stored in SLA metrics 502 and send the one or more recommended SLA metrics to SD-WAN leaf nodes 204 to cause each of the SD-WAN leaf nodes 204 to compute an intent-based SLA metric that is used to determine a path to send traffic for the application or application-group.

SLA controller 500 may include a recommended SLA metric module 508 to compute a recommended SLA metric based on an aggregate of a metric for an application and/or application-group received from each of the SD-WAN leaf nodes 204. Recommended SLA metric module 508 may be implemented in a manner consistent with the description of SLA metric module 212 provided in connection with FIG. 2. For example, recommended SLA metric module 508 may retrieve an aggregate of a respective SLA metric for a respective application and/or application-group from SLA metrics 502 and compute a mean (and in some instances a standard deviation) of the aggregate of the respective metric. Recommended SLA metric module 508 may store the recommended SLA metric in SLA metrics 502.

Device manager 504 may retrieve recommended SLA metrics for the applications and/or application-groups from SLA metrics 502 and send the recommended SLA metrics to SD-WAN leaf nodes 204 using, for example, SSL 506.

Figure 6:
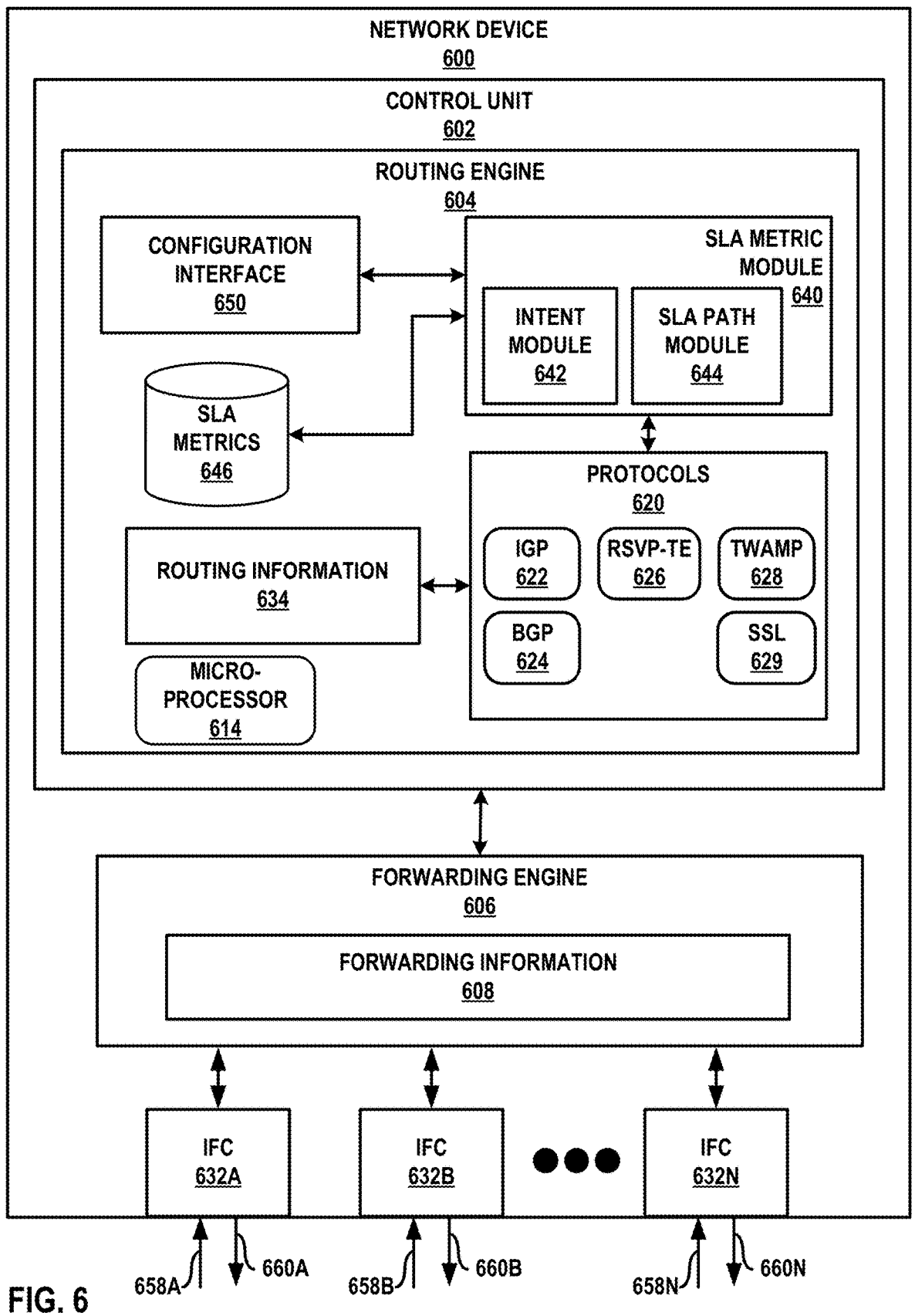
FIG. 6 is a block diagram illustrating an example network device configured in accordance with one or more aspects of the techniques described herein.

FIG. 6 is a block diagram illustrating an example network device configured in accordance with one or more aspects of the techniques described herein. Network device 600 of FIG. 6 may represent network devices 13 of FIG. 1, and the SD-WAN leaf nodes 204 of FIGS. 2-5 in further detail.

Network device 600 includes a control unit 602 that includes a routing engine 604, and control unit 602 is coupled to forwarding engine 606 (otherwise referred to herein as "forwarding unit 606"). Forwarding engine 606 is associated with one or more of interface cards 632A-632N ("IFCs 632") that receive packets via inbound links 658A-658N ("inbound links 658") and send packets via outbound links 660A-660N ("outbound links 660"). IFCs 632 are typically coupled to links 658, 660 via a number of interface ports (not shown). Interfaces for inbound links 658 and outbound links 660 may represent physical interfaces, logical interfaces, or some combination thereof. Interfaces for links 658, 660 may represent local interfaces of network device 600 for WAN links to network devices of SD-WAN 7 of FIG. 1.

In general, control unit 602 may represent hardware or a combination of hardware and software of control that implements one or more protocols 620 to learn and maintain routing information 634. Routing information 634 may include information defining a topology of a network, such as service provider network 2 of FIG. 1. For example, routing information may define routes (e.g., series of next hops) through a network to destinations/prefixes within the network learned via a distance-vector routing protocol (e.g., BGP 624) or defines the network topology with interconnected links learned using a link state routing protocol (e.g., ISIS- or OSPF) of IGP 622. Protocols 620 interact with a kernel (not shown in FIG. 6), e.g., by way of API calls, executing on control unit 602 to update routing information 634 based on routing protocol messages received by network device 600. The kernel of control unit 602 executes master microprocessor(s) 614 and may comprise, for example, a UNIX operating system derivative such as Linux or Berkeley Software Distribution (BSD). The kernel offers libraries and drivers by which user-level processes may interact with the underlying system. Microprocessor 614 that executes program instructions loaded into a main memory (not shown in FIG. 6) from a storage device (also not shown in FIG. 6) in order to execute the software stack, including both the kernel and processes executing on the operating environment provided by the kernel. Microprocessor 614 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

The kernel processes kernel calls from routing protocols 620 to generate forwarding information 608 based on the network topology represented in routing information 634. Typically, forwarding information 608 is generated in the form of radix or other lookup trees to map packet information (e.g., header information having destination information and/or a label stack) to next hops and ultimately to interface ports of IFCs 632 associated with forwarding engine 606. Forwarding information 608 may associate, for example, network destinations with specific next hops and corresponding IFCs 632. For MPLS-related traffic forwarding, forwarding information 808 stores label information that includes an incoming label, and outgoing label, and a next hop for a packet. Control unit 602 may then program forwarding engine 606 of the network device data plane with forwarding information 608, which installs the forwarding information within an application specific integrated circuit (ASIC) (not shown in FIG. 6), for example.

The architecture of network device 600 illustrated in FIG. 6 is shown for example purposes only. This disclosure is not limited to this architecture. In other examples, network device 600 may be configured in a variety of ways. In one example, some of the functionality of control unit 602 may be distributed within IFCs 632. Control unit 602 may be implemented solely in software, or hardware, or may be implemented as combinations of software, hardware, or firmware. For example, control unit 602 may include one or more of a processor, a programmable processor, a general purpose processor, a digital signal processor (DSP), an integrated circuit, an application specific integrated circuit (ASIC), a field programmable gate array (FPGA), or any type of hardware unit capable of implementing the techniques described herein. Control unit 602 may further include one or more processors which execute software instructions stored, embodied, or encoded in a computer-readable medium, such as a computer-readable storage medium. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), Flash memory, a hard disk, a CD-ROM, a floppy disk, a cassette, a solid state drive, magnetic media, optical media, or other computer-readable media. In some instances, the computer-readable storage medium may include instructions that cause a programmable processor to perform the techniques described herein.

In the example of FIG. 6, routing engine 604 provides an operating environment of one or more traffic engineering protocols to establish tunnels for forwarding subscriber packets through the ordered set of service nodes 10 associated with different service chains. For example, Resource Reservation Protocol with Traffic Engineering extensions (RSVP-TE) 626 may exchange traffic engineering information, such as MPLS labels for enabling label-based packet forwarding. As another example, routing engine 604 may use GRE or IP-based tunneling protocols (not shown) to establish traffic engineered tunnels. Routing engine 604 may maintain, for example, a traffic engineering database (TED) (not shown in FIG. 6) to store the traffic engineering data. Although not shown in FIG. 6, protocols 620 may include other protocols, such as label distribution protocol (LDP) or other traffic engineering protocols.

Routing engine 604 provides an operating environment of various application quality of experience (QoE) metric functions, such as real-time performance monitoring (RPM), one-way active measurement protocol (OWAMP), two-way active measurement protocol (TWAMP), active probing, passive-probing, protocol deep packet inspection (DPI) engines, or other measurement protocols or techniques. In the illustrated example of FIG. 6, routing engine 604 may use TWAMP 628 to execute one or more TWAMP logical roles, such as a TWAMP control-client, a TWAMP server, a TWAMP session-sender, and a TWAMP session-reflector. The execution of one or more TWAMP logical roles enables network device 600 to exchange test packets used to measure one or more metrics.

Routing engine 604 provides an operating environment of SSL 629. For example, routing engine 604 may use SSL 629 to establish a secure communication channel with an SLA controller to send the measured metrics to the SLA controller and to receive recommended SLA metrics from the SLA controller. Protocols 620 may include other communication protocols not shown in FIG. 6 (e.g., TLS, HTTP) to provide a communication channel with the SLA controller.

According to the techniques described in this disclosure, routing engine 604 may include an SLA module 640 that may dynamically learn in real-time or near real-time one or more metrics for each application and/or application-group. As described above, routing engine 604 may implement TWAMP 628 to exchange test packets with another network device to perform link state measurements. SLA metric module 640 may determine one or more metrics for each application and/or application-group based on the test packets. SLA metric module 640 may store the learned one or more metrics in SLA metrics 646.

SLA metrics 646 may store one or more learned metrics for each application and/or application-group. SLA metrics 646 may store one or more metrics, an application associated with the one or more metrics, an application-group associated with the application, or other information associated with the one or more metrics. In some examples, SLA metrics 646 may be implemented as any type of data structure, such as a data store or database. In such an example, SLA metrics 646 may represent any suitable data structure or storage medium for storing metrics and/or information relating to metrics dynamically learned by network device 600.

Routing engine 604 may implement SSL 629 to send the one or more learned metrics for each application and/or application-group to an SLA controller. Network device 600 may also use SSL 629 to receive one or more recommended SLA metrics for each application and/or application-group from the SLA controller. In such examples, network device 600 may send an SSL message with the one or more learned metrics, and receive an SSL message with the one or more recommended SLA metrics from the SLA controller.

SLA metric module 640 may include an intent module 642 that may compute an intent-based SLA metric for each application and/or application-category. For example, intent module 642 may compute the intent-based SLA metric for an application or application-group based on a recommended SLA metric of the application or application-category received from the SLA controller, characteristics of one or more links connected to network device 600 (e.g., links connected to one or more of IFCs 632), and a user configured intent model for the application or application-group.

As described above, the user configured intent model defines a desired tolerance level to further fine tune the recommended SLA metric received from the SLA controller. In the illustrated example of FIG. 6, a user may configure an intent model using configuration interface 650 of routing engine 604. Configuration interface 650 may represent a command line interface, graphical user interface, Simple Network Management Protocol (SNMP), NETCONF or another configuration protocol, or some combination of the above in some examples. Configuration interface 650 receives configuration data configuring one or more user configured intent models that are used to fine tune recommended SLA metrics received from the SLA controller.

SLA metric module 640 may include an SLA path module 644 to establish paths between endpoints over a path computation domain. Paths may be requested based on various SLA metrics. That is, SLA path module 644 may select a path for a respective application and/or application-group that satisfies a given SLA metric. To compute paths through the path computation domain, SLA path module 644 may discover the topology of the network (e.g., by executing IGP 622 or BGP 624 to receive routing protocol advertisements) and may receive a list of node neighbors, with each neighbor including a node identifier, local port index, and remote port index, as well as a list of link attributes each specifying a port index, bandwidth, expected time to transmit, shared link group, and fate shared group, for instance.

SLA path module 644 may select a path along one or more of the interconnecting communication links that satisfy the intent-based SLA metric computed by intent module 642. For example, SLA path module 644 may implement one or more shortest path algorithms as described above. In response to implementing a shortest path algorithm, SLA path module 644 may determine whether each of the interconnecting communication links satisfies or does not satisfy the intent-based SLA metric. SLA path module 644 may store the determined path and an indication for each of the interconnecting communication links on whether the links satisfies or does not satisfy the intent-based SLA metric.

Figure 7:
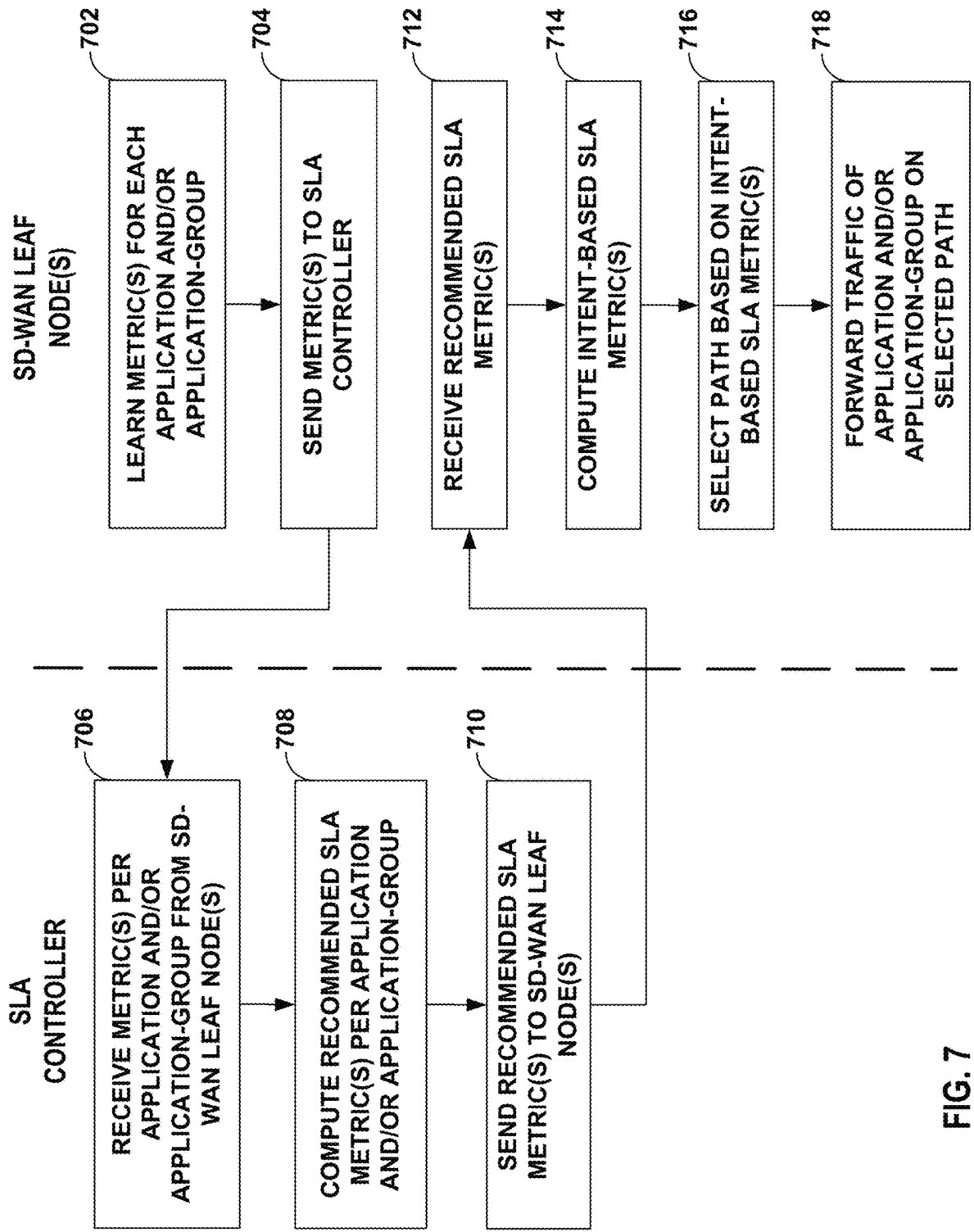
FIG. 7 is a flow diagram illustrating an example technique for a SD-WAN that performs dynamic application SLA metric generation, distribution, and intent-based SD-WAN link selection, in accordance with one or more aspects of the techniques described in this disclosure.

FIG. 7 is a flow diagram illustrating an example technique for an SD-WAN that performs dynamic application Service Level Agreement metric generation, distribution, and intent-based SD-WAN link selection, in accordance with one or more aspects of the techniques described in this disclosure. The example operation is described with respect to SLA controller 500 of FIG. 5 and network device 600 of FIG. 6. The following are steps of the process, although other examples of the process performed in the techniques of this disclosure may include additional steps or may not include some of the below-listed steps.

In accordance with the techniques described herein, an SD-WAN leaf node of a plurality of SD-WAN leaf nodes may learn one or more metrics for each application and/or application-group (702). For example, each of the SD-WAN leaf nodes may use various application quality of experience (QoE) metric functions, such as RPM, OWAMP, TWAMP, active probing, passive-probing, protocol DPI engines, or other measurement protocols or techniques to learn the one or more metrics for each application and/or application-group of its links. The SD-WAN leaf nodes may each store the learned one or more metrics in a local SLA metrics data structure.

Each of the SD-WAN leaf nodes may send the learned one or more metrics for each application and/or application-group to an SLA controller (704). For example, each of the SD-WAN leaf nodes may use a protocol to establish a communication channel, such as secure sockets layer (SSL), Transport Layer Security (TLS), Hyper Text Transport Layer (HTTP), or Hyper Text Transfer Protocol Secure (HTTPS). Each of the SD-WAN leaf nodes may send the learned one or more metrics stored in its SLA metrics data structure to the SLA controller. For example, each of the SD-WAN leaf nodes may send one or more learned metrics for a specific application to the SLA controller. Alternatively, or additionally, each of the SD-WAN leaf nodes may send one or more learned metrics for a group of applications (e.g., web applications, or NRTA applications) to the SLA controller. Each of the SD-WAN leaf nodes may send the one or more learned metrics as a batch, or in some instances as they are learned. In some instances, the SD-WAN leaf nodes may periodically send the one or more metrics based on configured intervals (e.g., every 15 minutes).

The SLA controller may receive the one or more metrics from each of the SD-WAN leaf nodes (706) and compute a recommended SLA metric for each application and/or application-group (708). For example, the SLA controller may receive a metric for an application or application-group from each of the SD-WAN leaf nodes. The SLA controller may include recommended SLA metric module 508 to compute a mean (and in some instances a standard deviation) of the aggregate of the metric for the application and/or application-group. The SLA controller may compute a mean for an aggregate of the SLA metric for each application and/or application-group.

The SLA controller may send the recommended SLA metric for each of the applications and/or application-groups to each of the SD-WAN leaf nodes (710). For example, the SLA controller may send the recommended SLA metrics using SSL.

When an SD-WAN leaf node of the plurality of SD-WAN leaf nodes receives the recommended SLA metric for each of the applications and/or application-groups (712), the SD-WAN leaf node may compute an intent-based SLA metric (714). For example, the SD-WAN leaf node may include an intent module 642 of an SLA metric module 640 that computes an intent-based SLA metric based on the recommended SLA metric received from the SLA controller, one or more characteristics of links connected to the SD-WAN leaf node, and a user configured intent model that defines a desired tolerance level to further fine tune the recommended SLA metric received from the SLA controller. For example, a user may configure (e.g., via configuration interface 650) an aggressive intent model that may cause the SD-WAN leaf node to aggressively apply the recommended SLA metric (e.g., selecting a link that has a better RTT than the recommended SLA metric). A user may alternatively, or additionally, configure a normal intent model that may cause the SD-WAN leaf node to apply the recommended SLA metric as is. Alternatively, or additionally, a user may configure a weak intent model that may cause the SD-WAN leaf node to conservatively apply the recommended SLA metric (e.g., selecting a more deteriorated link than a link that better satisfies the recommended SLA metric).

Each of the SD-WAN leaf nodes may select a path based on the intent-based SLA metric for a respective application and/or application-group (716). For example, the SD-WAN leaf nodes may each include an SLA path module 644 to establish paths between endpoints over a path computation domain. The SLA path module 644 of each of the SD-WAN leaf nodes may select a path for a respective application and/or application-group that satisfies the intent-based SLA metric. The SLA path module 644 of each of the SD-WAN leaf nodes may select a path along one or more of the interconnecting communication links that satisfy the intent-based SLA metric computed by intent module 642. For example, the SLA path module 644 may implement one or more shortest path algorithms as described above. In response to implementing a shortest path algorithm, SLA path module 644 may determine whether each of the interconnecting communication links satisfies or does not satisfy the intent-based SLA metric. SLA path module 644 may store the determined path and an indication for each of the interconnecting communication links on whether the links satisfies or does not satisfy the intent-based SLA metric.

In some examples, each of the SD-WAN leaf nodes may also dynamically determine the shortest path based on a per hop metric. For example, each of the SD-WAN leaf nodes may determine a shortest path when the user configured intent model is changed, e.g., from an aggressive intent model to a weaker intent model. For instance, an SD-WAN leaf node may, at an initial instance (e.g., T1), be configured with an aggressive intent model for an application. When the SD-WAN receives traffic from the application, the SD-WAN leaf node may select a respective link that meets the SLA metrics of the aggressive intent model. A user may, in a subsequent instance (e.g., ΔT), change the aggressive intent model to a conservative intent model for the application. When the SD-WAN leaf node receives traffic from the application, the SD-WAN leaf node may select a more deteriorated link that is may meet the more conservative SLA metrics of the weaker intent model.

Each of the SD-WAN leaf nodes may forward traffic of a particular application and/or application-group on the selected path that satisfies the intent-based SLA metric (718). For example, SD-WAN leaf nodes may send traffic of a respective application or application-group on links connecting SD-WAN leaf nodes that satisfy the intent-based SLA metric for the application or application-group.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A method comprising:
receiving, by a controller and from a plurality of network devices of a network, a metric for each of the plurality of network devices, wherein the metric is associated with an application or application-group;
computing, by the controller and based on an aggregate of the metric received from each of the plurality for network devices, a recommended service level agreement (SLA) metric for the application or application-group; and
sending, by the controller, the recommended SLA metric to each of the plurality of network devices to cause each of the plurality of network devices to compute an intent-based SLA metric used to select a path to send traffic from the application or application-group, wherein the intent-based SLA metric is computed based on the recommended SLA metric and an intent model that defines a tolerance level to apply the recommended SLA metric.

2. The method of claim 1, wherein computing the recommended SLA metric comprises determining a mean of the aggregate of the SLA metric received from each of the plurality of network devices.

3. The method of claim 1, wherein receiving the metric comprises receiving the metric as part of a batch of a plurality of metrics.

4. A method comprising:
determining, by a network device of a plurality of network devices of a network, a metric for the network device, wherein the metric is associated with an application or application-group;
sending, by the network device and to a controller, the metric;
receiving, by the network device and from the controller, a recommended service level agreement (SLA) metric associated with the application or application-group, wherein the recommended SLA metric is computed based on an aggregate of the metric from each of the plurality of network devices, including the metric sent by the network device;
computing, by the network device, an intent-based SLA metric based on the recommended SLA metric and an intent model that defines a tolerance level to apply the recommended SLA metric; and
selecting, by the network device and based on the intent-based SLA metric, a path to send traffic from the application or application-group.

5. The method of claim 4,
wherein determining the metric for the network device comprises determining a metric for one or more links connected to the network device,
wherein computing the intent-based SLA metric further comprises computing the intent-based SLA metric based on one or more characteristics of the one or more links,
wherein the one or more links comprises a wireless link, and
wherein the one or more characteristics of the wireless link comprises at least one of a latency, signal strength, coverage, data rate, bandwidth per unit area, frequency, and vendor.

6. The method of claim 4,
wherein determining the metric for the network device comprises determining a metric for one or more links connected to the network device,
wherein computing the intent-based SLA metric further comprises computing the intent-based SLA metric based on one or more characteristics of the one or more links,
wherein the one or more links comprises a physical link, and
wherein the one or more characteristics of the physical link comprises at least a link type, support for data rate, transceiver, standard, vendor, and signal strength.

7. The method of claim 4,
wherein the tolerance level of the intent model comprises at least one of an aggressive intent model that causes the network device to apply the recommended SLA metric in a more aggressive manner when selecting the path, a normal intent model that causes the network device to apply the recommended SLA metric as is when selecting the path, and a weak intent model that causes the network device to apply the recommended SLA metric in a more conservative manner when selecting the path.

8. The method of claim 4, wherein determining the path to send traffic from the application or application-group comprises determining a shortest path based on at least one of Dijkstra's algorithm, Bellman-Ford algorithm, Breadth-First Search (BFS), Depth-First Search (DFS), Floyd-Warshall algorithm, Johnson's algorithm, Kruskal's algorithm, Prim's algorithm, and Borůvka's algorithm.

9. The method of claim 4, wherein determining the metric comprises implementing a measurement protocol comprising at least one of a real-time performance monitoring (RPM), one-way active measurement protocol (OWAMP), two-way active measurement protocol (TWAMP), active probing, passive-probing, and protocol deep packet inspection (DPI) engines.

10. The method of claim 4, wherein sending the metric comprises sending the metric as part of a batch of a plurality of metrics.

11. The method of claim 4, wherein the recommended SLA metric comprises a mean of the aggregate of the SLA metric received from each of the plurality of network devices.

12. The method of claim 4, further comprising:
storing, by the network device, an indication of whether one or more links connected to the network device satisfy the intent-based SLA metric.

13. A network device of a plurality of network devices of a network comprising:
a memory; and
one or more processors in communication with the memory, the one or more processors configured to:
determine a metric of the network device, wherein the metric is associated with an application or application-group;
send the metric to a controller;
receive, from the controller, a recommended service level agreement (SLA) metric associated with the application or application-group, wherein the recommended SLA metric is computed based on an aggregate of metrics from the plurality of network devices, including the metric sent by the network device;
compute an intent-based SLA metric based on the recommended SLA metric and an intent model that defines a tolerance level to apply the recommended SLA metric; and
select, based on the intent-based SLA metric, a path to send traffic from the application or application-group.

14. The network device of claim 13,
wherein to determine the metric for the network device, the one or more processors are further configured to determine a metric for one or more links connected to the network device,
wherein to compute the intent-based SLA metric, the one or more processors are further configured to compute the intent-based SLA metric based on one or more characteristics of the one or more links,
wherein the one or more links comprises a wireless link, and
wherein the one or more characteristics of the wireless link comprises at least one of a latency, signal strength, coverage, data rate, bandwidth per unit area, frequency, and vendor.

15. The network device of claim 13,
wherein to determine the metric for the network device, the one or more processors are further configured to determine a metric for one or more links connected to the network device,
wherein to compute the intent-based SLA metric, the one or more processors are further configured to compute the intent-based SLA metric based on one or more characteristics of the one or more links,
wherein the one or more links comprises a physical link, and
wherein the one or more characteristics of the physical link comprises at least a link type, support for data rate, transceiver, standard, vendor, and signal strength.

16. The network device of claim 13,
wherein the tolerance level of the intent model comprises at least one of an aggressive intent model that causes the network device to apply the recommended SLA metric in a more aggressive manner when selecting the path, a normal intent model that causes the network device to apply the recommended SLA metric as is when selecting the path, and a weak intent model that causes the network device to apply the recommended SLA metric in a more conservative manner when selecting the path.

17. The network device of claim 13, wherein, to determine the path to send traffic from the application or application-group, the one or more processors are configured to determine a shortest path based on at least one of Dijkstra's algorithm, Bellman-Ford algorithm, Breadth-First Search (BFS), Depth-First Search (DFS), Floyd-Warshall algorithm, Johnson's algorithm, Kruskal's algorithm, Prim's algorithm, and Borůvka's algorithm.

18. The network device of claim 13, wherein, to determine the metric, the one or more processors are configured to implement a measurement protocol comprising at least one of a real-time performance monitoring (RPM), one-way active measurement protocol (OWAMP), two-way active measurement protocol (TWAMP), active probing, passive-probing, and protocol deep packet inspection (DPI) engines.

19. The network device of claim 13, wherein the recommended SLA metric comprises a mean of the aggregate of the metric received from each of the plurality of network devices.

20. The network device of claim 13, wherein the one or more processors are further configured to:

store an indication of whether one or more links connected to the network device satisfy the intent-based SLA metric.

\* \* \* \* \*

UNITED STATES PATENT AND TRADEMARK OFFICE
CERTIFICATE OF CORRECTION

| | |
|---|---|
| PATENT NO. | : 11,831,520 B2 |
| APPLICATION NO. | : 17/301280 |
| DATED | : November 28, 2023 |
| INVENTOR(S) | : Thyagarajan S. Pasupathy et al. |

Page 1 of 1

It is certified that error appears in the above-identified patent and that said Letters Patent is hereby corrected as shown below:

In the Claims

Column 25, Line 30 (Claim 8): Replace "(BF S)" with -- (BFS) --.

Signed and Sealed this
Twenty-second Day of April, 2025

Coke Morgan Stewart
*Acting Director of the United States Patent and Trademark Office*